(12) United States Patent
Flade et al.

(10) Patent No.: US 11,948,454 B2
(45) Date of Patent: Apr. 2, 2024

(54) METHOD AND SYSTEM FOR ENHANCING TRAFFIC ESTIMATION USING TOP VIEW SENSOR DATA

(71) Applicant: Honda Research Institute Europe GmbH, Offenbach/Main (DE)

(72) Inventors: Benedict Flade, Offenbach (DE); Nils Einecke, Offenbach (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 737 days.

(21) Appl. No.: 17/084,652

(22) Filed: Oct. 30, 2020

(65) Prior Publication Data

US 2022/0139213 A1    May 5, 2022

(51) Int. Cl.
| | |
|---|---|
| G08G 1/01 | (2006.01) |
| G06V 10/25 | (2022.01) |
| G06V 20/10 | (2022.01) |
| G06V 20/13 | (2022.01) |
| G06V 20/17 | (2022.01) |
| G06V 20/54 | (2022.01) |
| G08G 1/017 | (2006.01) |
| G08G 1/04 | (2006.01) |

(52) U.S. Cl.
CPC ........... *G08G 1/0145* (2013.01); *G06V 10/25* (2022.01); *G06V 20/13* (2022.01); *G06V 20/17* (2022.01); *G06V 20/182* (2022.01); *G06V 20/54* (2022.01); *G08G 1/0116* (2013.01); *G08G 1/0125* (2013.01); *G08G 1/0175* (2013.01); *G08G 1/04* (2013.01)

(58) Field of Classification Search
CPC .. G08G 1/0145; G08G 1/0116; G08G 1/0125; G08G 1/0175; G08G 1/04; G06V 10/25; G06V 20/13; G06V 20/17; G06V 20/182; G06V 20/54
USPC ........................................................ 701/118
See application file for complete search history.

(56) References Cited

U.S. PATENT DOCUMENTS

| | | |
|---|---|---|
| 6,489,920 B1 | 12/2002 | Anders et al. |
| 9,401,086 B2 | 7/2016 | Basalamah |
| 9,891,057 B2 | 2/2018 | Goto et al. |

(Continued)

FOREIGN PATENT DOCUMENTS

WO   2013135535   9/2013

*Primary Examiner* — Jacob S. Scott
*Assistant Examiner* — Michael E Butler
(74) *Attorney, Agent, or Firm* — JCIPRNET

(57) ABSTRACT

A method and a system for controlling at least one of a traffic infrastructure device, an actuator of a traffic participant based on enhanced traffic data is provided. The method comprises steps of monitoring, by a trigger processor, an area; generating, by the trigger processor, trigger data in case a trigger event is determined in the monitored area and providing the generated trigger data indicating an area-of-interest to an image data source; obtaining image data on the area-of-interest based on the transmitted trigger data and transmitting the obtained image data to a traffic evaluation processor; evaluating, by the traffic evaluation processor, the obtained image data to generate enhanced traffic data on the area-of-interest; and outputting, by the traffic evaluation processor, the generated enhanced traffic data in a control signal, wherein the control signal is configured to control the traffic infrastructure device and/or the actuator of the traffic participant.

14 Claims, 7 Drawing Sheets

(56) References Cited

U.S. PATENT DOCUMENTS

| | | | |
|---|---|---|---|
| 10,248,124 B2 | 4/2019 | Bellaiche | |
| 10,559,198 B1* | 2/2020 | Price | G08G 1/04 |
| 2005/0099322 A1 | 5/2005 | Wainfan et al. | |
| 2007/0069920 A1* | 3/2007 | Hakki | G08G 1/005 |
| | | | 340/907 |
| 2015/0153735 A1* | 6/2015 | Clarke | B60T 8/32 |
| | | | 701/301 |
| 2016/0148507 A1* | 5/2016 | Pittman | G06Q 30/0255 |
| | | | 340/917 |
| 2016/0236683 A1 | 8/2016 | Eggert et al. | |
| 2017/0084172 A1* | 3/2017 | Rolle | G08G 1/0129 |
| 2018/0342156 A1* | 11/2018 | Martin | G08G 1/052 |
| 2019/0268743 A1* | 8/2019 | Cho | B60Q 1/545 |

\* cited by examiner

METHOD AND SYSTEM FOR ENHANCING TRAFFIC ESTIMATION USING TOP VIEW SENSOR DATA

TECHNICAL FIELD OF THE DISCLOSURE

The disclosure relates to the field of traffic estimation and controlling traffic infrastructure and vehicles. In particular, a method and a system for estimating traffic density using dynamically acquired image data from air or space-based imaging devices is presented.

BACKGROUND

In an increasingly dynamic and congested traffic environment, accurate estimation and prediction of the current traffic situation becomes an increasingly important task. Accurate traffic density estimation and prediction gains importance for controlling traffic infrastructure, for example, traffic lights, and performing dynamic lane assignment.

Traditionally, special traffic infrastructure devices, e.g. induction loop, camera, radar devices measure the velocity of traffic participants and estimate traffic density at selected points of interest. While this information exhibits high accuracy, it is only sparsely available at a few critical positions in the road infrastructure due to the considerable cost involved.

More recently, exploiting the wide distribution of mobile devices such as smartphones provides an extensive data basis for estimating traffic density by means of mobile device position information. Determining a traffic density may be performed indirectly based on measurements of mobile devices such as smartphones. More specifically, GNSS or similar localization devices in a plurality ("swarm") of mobile devices can be used to determine microscopic features such as the position and velocity of agents on the road. Leveraging the determined positions and velocities of the mobile devices enables the deduction of macroscopic features such as the traffic density.

However, such indirect estimation of traffic density is error-prone. One potential source of error is a vehicle with multiple passengers, and thus mobile devices that is misinterpreted as multiple vehicles. Furthermore, most state-of-the-art position information is not sufficiently accurate to robustly relate such telemetry data to individual lanes of a road. However, precise measurements are of particular importance when controlling road infrastructure devices such as traffic lights or when performing traffic-based autonomous vehicle navigation.

U.S. Pat. No. 9,401,086 B2 discloses a technique for using mobile device data in order to detect changes in traffic flow. The detection of changes in traffic density may, inter alia, be augmented using data acquired from satellites. Specifically, it is claimed that satellite images are compared to reference images in order to detect changes in traffic volume. However, image processing of satellite images requires extensive processing resources, in particular when the results are to be provided in almost real time.

It is an object of the present disclosure to provide an improved and more efficient approach for estimating traffic density and controlling traffic infrastructure and vehicles in a dynamic traffic environment.

SUMMARY

The present disclosure provides a method, a program, and a system for estimating traffic density.

A first aspect of the disclosure concerns a method for controlling at least one of a traffic infrastructure device or an actuator of a traffic participant based on enhanced traffic data comprises monitoring, by a trigger processor, an area in the traffic environment. The trigger processor generates trigger data in case a trigger event is determined in the monitored area and provides the generated trigger data indicating an area-of-interest to an image data source. The area-of-interest includes at least a portion of the monitored area. The method proceeds by obtaining image data on the area-of-interest based on the transmitted trigger data and transmits the acquired image data to a traffic evaluation processor. The traffic evaluation processor evaluates the image data to generate enhanced traffic data on the area-of-interest, and outputs the generated enhanced traffic data in a control signal. The control signal is configured to control the traffic infrastructure device and/or to control the actuator of the traffic participant.

A program according to a second aspect comprises program-code means for executing the steps according to any of the preceding exemplary embodiments, when the program is executed on a computer or digital signal processor.

A system for controlling at least one of a traffic infrastructure device or an actuator of a traffic participant based on generated enhanced traffic data according to the third aspect comprises a trigger processor which is configured to monitor an area, to generate trigger data in case a trigger event is determined in the monitored area, and to provide the generated trigger data indicating an area-of-interest to an image data source. The area-of-interest includes a portion of the monitored area. The system further comprises an image data source configured to acquire image data on the area-of-interest based on the trigger data, wherein the image data is captured by a capture device. The obtained image data is transmitted data to a traffic evaluation processor of the system. The traffic evaluation processor is configured to evaluate the image data to generate enhanced traffic data on the area-of-interest. The system also comprises an output device, which is configured to output the generated enhanced traffic data in a control signal. The control signal is configured to control the traffic infrastructure device and/or to control the actuator of the traffic participant based on the generated enhanced traffic data.

BRIEF DESCRIPTION OF THE DRAWINGS

The disclosure is now explained in more detail with reference to the accompanying drawings.

Figure 1:
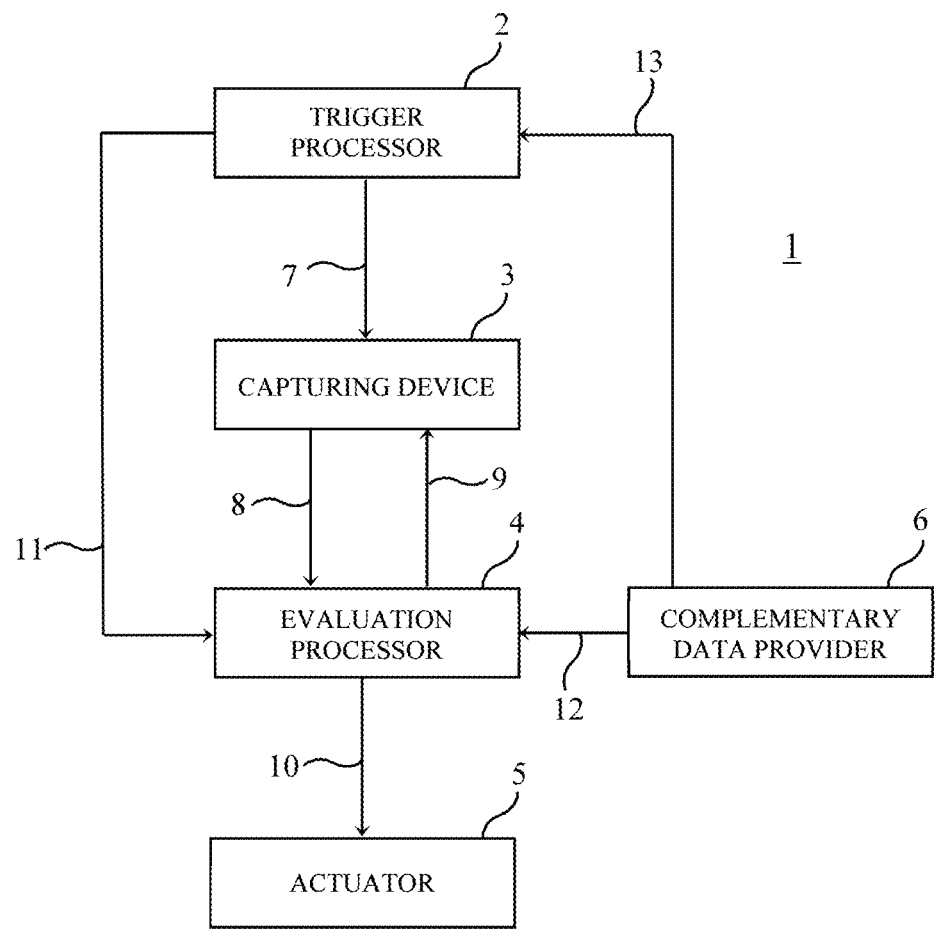
FIG. 1 depicts an overview over a system according to an exemplary embodiment of the disclosure.

Same or corresponding features are denoted in the figures by the same reference signs.

DETAILED DESCRIPTION

The disclosure provides the method according to the first aspect, the program according to the second aspect, and the system according to the third aspect of the disclosure.

A first aspect of the disclosure concerns a method for controlling at least one of a traffic infrastructure device or an actuator of a traffic participant based on enhanced traffic data comprises monitoring, by a trigger processor, an area in the traffic environment. The trigger processor generates trigger data in case a trigger event is determined in the monitored area and provides the generated trigger data indicating an area-of-interest to an image data source. The area-of-interest includes at least a portion of the monitored area. The method proceeds by obtaining image data on the area-of-interest based on the transmitted trigger data and transmits the acquired image data to a traffic evaluation processor. The traffic evaluation processor evaluates the image data to generate enhanced traffic data on the area-of-interest, and outputs the generated enhanced traffic data in a control signal. The control signal is configured to control the traffic infrastructure device and/or to control the actuator of the traffic participant.

According to the present disclosure, a direct estimation of the traffic density by measuring becomes achievable. In particular, multiple people, and their corresponding mobile devices, located in a single vehicle do not impact the traffic density estimation. Additionally, a more precise location measurement for vehicles due to the increased position accuracy of the image data when compared to the accuracy of position information of mobile devices improves traffic density estimation, for example, by correct allocation of vehicles to individual lanes of a road.

These advantages are achieved without having to bear the cost of stationary telemetry device infrastructure along roads. The inventive approach benefits from the increased availability of top-view image data, for example from satellite based sensors or autonomous unmanned aerial vehicles (UAV). Aerial vehicles and satellites in low earth orbit may capture top-view images with a resolution of at least 30 to 50 cm per pixel. This resolution suffices to distinguish individual vehicles from other objects. Exploiting top view sensor data enables to provide a method for enhancing traffic prediction significantly.

The advantages of the method exceed a mere improved accuracy of traffic density estimation. Since acquiring and processing of a large amount of image data, e.g. image streams from large areas, cities or regions at the same time requires large processing and transmitting capacities, the method employs a concept of triggering to efficiently identify and select locations and times at which a more accurate analysis of traffic flow is beneficial for controlling a vehicle or traffic, in general. This may be done based on trigger data that can be generated based on, e.g. Traffic Message Channels (TMC), weather station forecasts or -warnings, or even individual road users. For example, at specific locations identified as critical or important to analyze, image data such as top view sensor data are dynamically captured by a capturing device, e.g. a camera sensor or radar sensor on a satellite or UAV and analyzed on a macroscopic level, even achieving lane-level resolution for the resulting enhanced traffic information.

With the present disclosure, it is possible to deduce from the generated enhanced traffic data blocking of a traffic route, or individual lanes of a road, a decrease in capacity of a road or an alteration (change) of a traffic route.

In the context of the present disclosure, the term "vehicles" is not restricted to road vehicles and the term "traffic" is not restricted to automobile road traffic, nor the term "route" to a road (street). Advantageous application areas of the method cover also other land vehicles, air vehicles such as planes on air traffic routes in an air traffic scenario, sea vehicles such as ships on shipping routes, or other agents such as hikers on hiking tracks, for example in a national state park.

The actuator may use the enhanced traffic data for generating an output on a display to a driver of a vehicle based on the enhanced traffic information.

The obtained image data in the method according to an exemplary embodiment include at least one of a camera image, a radar image, a multi-spectral image and a point cloud.

The camera image may be an RGB image, but is not limited to an RGB image.

The cited examples of image data provide advantageously high image resolution over a large area. Thus, the obtained image data enables to estimate the traffic data with a correspondingly high accuracy by far exceeding the known approaches relying on position data acquired based on mobile devices, for example. While image data (sensor data) acquired by a camera sensor offers high resolution and thus high location accuracy, a radar sensor may provide image data under adverse weather conditions. Image data originating from a sensor suite combining different sensor types may therefore reveal additional benefits for present method.

Generating the trigger data of an advantageous exemplary embodiment bases on at least one of TMC data, disaster or weather warnings, telemetry data acquired by at least one traffic infrastructure device and data on mobile wireless devices in the monitored area.

The trigger processor relies on readily available input data to determine if a trigger event occurs. This input data may be processed requiring limited processing resources on the one hand, and enable to judge if, when and for what location a more detailed evaluation of image data will be advantageous for generating enhanced traffic data and controlling an actuator based thereon. A trigger event may be a presumed event which influences a current traffic flow or a predicted traffic flow in the monitored area. A trigger event can be, for example, a presumed traffic jam, an announced construction site, or a thunderstorm warning predicting high wind speeds.

Generating the trigger data based on telemetry data and or data on mobile wireless devices in the monitored area may include calculating at least one of a mean traffic density value or a mean velocity value.

In an exemplary embodiment, the trigger event is determined in case a difference of the calculated mean traffic density value from a predetermined traffic density value exceeds a predetermined traffic density threshold.

Calculating a mean value is computationally efficient and simultaneously allows reliably judging if more detailed analysis of image data will yield traffic data of significance for the current traffic scenario and/or the prediction of an evolvement of traffic in the monitored area.

In an exemplary embodiment, the trigger event may include at least one of a traffic jam, an accident, an emergency call, a construction site, a weather phenomenon, and a natural disaster.

The cited examples for trigger events may each result in traffic scenarios, in which additional data on traffic, in a particular a traffic density estimation with high precision and actuality may offer benefits for route planning and vehicle actuation.

The method according to an exemplary embodiment includes a step of obtaining, from a complementary information provider, complementary information, wherein the complementary information includes in particular map data, on the monitored area. The trigger data may then be generated based on the determined trigger event and the obtained complementary information, For the analysis of the traffic flow in the step of evaluating the image data, the method can include data from complementary sources, as e.g. mobile phones that are providing telemetry information generated by their built-in Global Navigation Satellite Systems (GNSS) receivers. This additional data acquired as complementary information, enables to determine critical areas in the monitored area, which allow for further limiting the area-of-interest and thus even more significantly reduces the required processing power. Complementary information such as road map data enables to limit the processing exclusively to portions representing road areas in the obtained image data, while other parts of the image data can be ignored as carrying no relevant information for the task of traffic density estimation. Nevertheless, the complementary information is optional when executing the method. The method achieves advantageous results even if no additional complementary information from the complementary data provider is available, or used for traffic flow analysis by evaluating the image data from the capturing device.

In an exemplary embodiment, the obtained image data comprises preprocessing the obtained image data based on the obtained complementary information.

In an exemplary embodiment, the traffic evaluation processor may use the obtained complementary information for restricting evaluation of the image data in the area-of-interest.

Preferably, the traffic evaluation processor evaluates the image data including using the obtained complementary information for restricting evaluation of the image data on traffic routes in the area-of-interest.

Thus the complementary information enables to efficiently use processing resources in the most complex processing step of evaluating image data by reducing the obtained image data to the relevant portions for the task at hand.

In an exemplary embodiment, the step of evaluating the image data includes the traffic evaluation processor using road map data included in the obtained complementary information, for evaluating the image data with lane level accuracy.

Most state-of-the-art position information is not sufficiently accurate to robustly locate a vehicle on an individual lane. The present method enables lane-level traffic density estimation by including image data in a dynamic manner using the trigger data. Contrary thereto, measurements from road infrastructure devices show in most cases also lane-level accuracy, but are only sparsely available at a few critical positions in the existing road infrastructure, and require significant infrastructure investment, while only achieving stationary improvement to lane level accuracy.

The method according to an embodiment includes in the step of evaluating, the traffic evaluation processor using the obtained complementary information, and in particular road map data, for distinguishing between parked vehicles and driving vehicles based on a location of the vehicles.

Complementary information including map data enables to discriminate between lanes for moving vehicles and parked vehicles on the other hand, and thereby avoids a misinterpretation of inherently static image data on the one hand, and simultaneously reduces the image data further which has to be processed in the when performing traffic analysis in the evaluation step.

Evaluating the image data may in an exemplary embodiment include detecting vehicles and classifying the detected vehicles according to different vehicle types (vehicle classes). Vehicle types may include passenger vehicles, motorcycles, busses, trucks, small commercial transporters, public transporters. Such classification may offer additional advantages in traffic control, for example for a dynamic assignment of lanes to specific classes of vehicles based on the generated enhanced traffic data.

The evaluation step performed by the traffic evaluation processor may include extracting features from the image data, and aligning the obtained complementary information with the image data based on the extracted features.

The obtained image data enables via feature extraction and alignment of features with complementary information, in particular a road map, an evaluation of traffic with increased accuracy due to combining data from plural independent data sources.

In the second aspect, a program comprises program-code means for executing the steps according to any of the preceding exemplary embodiments, when the program is executed on a computer or digital signal processor.

A system for controlling at least one of a traffic infrastructure device or an actuator of a traffic participant based on generated enhanced traffic data according to the third aspect comprises a trigger processor which is configured to monitor an area, to generate trigger data in case a trigger event is determined in the monitored area, and to provide the generated trigger data indicating an area-of-interest to an image data source. The area-of-interest includes a portion of the monitored area. The system further comprises an image data source configured to acquire image data on the area-of-interest based on the trigger data, wherein the image data is captured by a capture device. The obtained image data is transmitted data to a traffic evaluation processor of the system. The traffic evaluation processor is configured to evaluate the image data to generate enhanced traffic data on the area-of-interest. The system also comprises an output device, which is configured to output the generated enhanced traffic data in a control signal. The control signal is configured to control the traffic infrastructure device and/or to control the actuator of the traffic participant based on the generated enhanced traffic data.

According to an exemplary embodiment, the capture device is arranged on at least one of a satellite or an air vehicle, in particular on an unmanned aerial vehicle (UAV), or an aircraft, or mounted on a high building.

Air-based or space-based sensor platforms for the capture device offer the capability to acquire image data from a top-view perspective. Top view image data, preferably preprocessed image data, acquired by a radar sensor or a camera sensor offer most advantageous details for the purpose of traffic evaluation and controlling actuators of traffic infrastructure or vehicles on enhanced traffic data generated therefrom.

The traffic evaluation processor system according to an exemplary embodiment includes at least one central server.

The distribution of processing tasks when executing the method by generating the enhanced traffic data includes evaluating image data and image data streams. Processing of image data requires significant processing resources. The system according to an exemplary embodiment is implemented by evaluating the image data on the area of-interest on one or plural centralized servers providing processing resources for generating the enhanced traffic data.

FIG. 1 depicts an overview over a system 1 implementing an exemplary embodiment of the invention. FIG. 1 shows key components of the system for controlling a traffic infrastructure device or a vehicle based on enhanced traffic data and its implementation in a road traffic scenario.

The system 1 for controlling a traffic infrastructure device or a vehicle implements the approach of processing dynamically acquired image data, e.g. satellite imagery, aerial images, or UAV images, to generate traffic related information in form of enhanced traffic data for controlling an actuator 5, e.g. controlling a vehicle or at least one dynamic traffic sign such as traffic lights.

The system 1 may be structured into the components that correspond to the functions: a trigger processor 2 generates trigger data 7 for obtaining image data and/or capturing of images and initiating of the processing. A capturing device 3 captures image data 8 and provides the image data 8 to the evaluation processor 4. The evaluation processor 4 performs an analysis (evaluation) on the obtained image data 8. The analysis of the image data 8 provides enhanced traffic data. A complementary data provider 6 provides complementary data 13 for the trigger processor 2 to support generating the trigger data 7, and complementary data 13 to the evaluation processor 4 for supporting evaluating the image data 8. An actuator 5 obtains the enhanced traffic data generated by the evaluation processor 4 in a control signal 10 from the evaluation processor 4 and acts based on the obtained enhanced traffic data in the traffic environment.

The trigger processor 2, the evaluation processor 4, and the complementary data provider 6 may be implemented in software running on one or plural computer servers.

The system 1 uses image data 8. The capturing device 3 captures the image data 8. The capturing device 3 may include at least one of a camera sensor, a radar sensor, and a multispectral sensor positioned on an UAV, an aircraft or a satellite. The capturing device 3 is accordingly suitably positioned in order to capture top-view images from an area on the ground (coverage area, surveillance area) and a current traffic scenario. The capturing device 3 provides images as image data 8. The image data 8 includes sensor data or preferably pre-processed sensor data. The image data 8 may comprise digital orthophotos.

The orthophoto may comprise an aerial image or satellite image that is geometrically corrected or orthorectified, such that a scale of the orthophoto is uniform over the orthophoto. The image follows a given map projection. Contrary to an uncorrected aerial image, an orthophoto enables measuring true distances, as the orthophoto is an accurate representation of the earth's surface, having been adjusted for topographic relief, lens distortion, and camera tilt, for example, by processing of the originally captured sensor data.

Preferably, the image data 8 includes the digital orthophoto as an orthorectified image from a satellite. In this context, orthorectification refers to geometrical correction of the image data 8.

The capturing device 3 may capture images and provide image data 8 including the captured images continuously as an image data stream. In an exemplary embodiment, the capturing device 3 captures images and provides image data 8 on demand, for example, triggered by the trigger data 7 from the trigger processor 4. In an exemplary embodiment, the capturing device 3 provides the image data 8 on a request from the evaluation processor 4, for example triggered by further trigger data 9 generated and provided by the evaluation processor 4.

A resolution of the image in the image data 8 provided by the capturing device 3 should be sufficient in order to reliably detect traffic entities such as motorcycles or cars in the image data 8. Preferably the resolution of the image data 8 is sufficient to distinguish and classify detected vehicles into distinct classes of vehicles. Possible classes for vehicles may include the classes "car", "bus", "truck", "motorcycle".

Acquiring captured image data 8 requires a suitable acquisition frequency and latency. In particular, a plurality of UAVs or a constellation of satellites acting as carrier platforms for capturing devices 3 offers these characteristics. Further sources for image data 8 may include capturing devices 3 arranged on aircraft or helicopters providing aerial images.

The capturing device 3 may perform image processing in order to generate the image data 8. Alternatively or additionally, the evaluation processor 4 may perform image pre-processing tasks, in particular taking sensor occlusions, and/or taking effects of image distortions in case of camera sensors providing visual image data into account.

The trigger processor 2 generates the trigger data 7 for obtaining the image data by capturing images and 8 and trigger data 11 for initiating of evaluation processing in the evaluation processor 11.

The trigger data 7 includes information that enables to move the focus of imaging of the capturing device 3 towards a specific spatial location in the area. This particular spatial location in the area is the area-of-interest. This restriction of image data 8 to the area-of-interest as sub-part of the monitored area results in reducing the amount of processing in the evaluation processor 4 by differentiating irrelevant areas from an area-of-interest in the monitored area.

Trigger data 7, 11 may include different types of triggers, for example one-shot triggers and continuous triggers.

One-shot triggers include triggers that refer to spatially static information or at single points in time. For example, the report of an accident by a Traffic Message Channel (TMC) or the report of the location of a road construction by a public authority or a passing witness result in generating trigger data 7 comprising respective one-shot triggers.

TMC describes a technology for delivering traffic and travel information to vehicle drivers and vehicle navigation systems. Current TMC information is digitally coded using the ALERT C or TPEG protocol into RDS Type 8A groups broadcasted via conventional FM radio, Digital Audio Broadcasting or satellite radio. Therefore, TMC delivers not only dynamic information suitable for reproduction or display in a user's language without interrupting audio broadcast service, but also information for an automated generation of trigger data 7, 11 due to identifying and locating of specific trigger events which influence traffic flow in the area-of-interest.

Continuous triggers result in steady image data streams that need to be monitored over a certain period of time. This includes, e.g., an analysis of a movement of a plurality of mobile devices in the area. Such information on a movement of a plurality of mobile devices in the area may be derived from complementary data 13 provided by the complementary data provider 6. The analysis performed by the trigger processor 2 provides a rough road-level traffic density information. In this case, the trigger processor 2 may issue a request by generating respective trigger data 8 and transmitting the request in the trigger data 8 to the capturing device 3 in case the analysis provides a predefined analysis result. Such predefined analysis result may be that a mean calculated on the rough road-level traffic density information exceeds a predetermined threshold. Exceeding the predetermined threshold defines a specific trigger event occurring in the monitored area. The generated trigger data 7, 11 then further includes a definition for a corresponding area-of-interest for this specific trigger event.

A plurality of mobile devices or a telemetry unit can provide data to both, the complementary data provider 6 and to the trigger processor 2.

The complementary data provider 6 provides static and/or dynamic complementary data 12, which may be employed in order to support the image data evaluation processing in the evaluation processor 4 by serving as an underlying basis and/or by representing a supplemental reference. Nevertheless, the image data 8 provided by the capture device 3 presents the main source of information for generating the enhanced traffic data.

Static complementary data 12, 13 may preferably include map data on the area, in particular on the area-of-interest, but complementary data 12, 13 is not limited to map data.

Map data, in particular geometrical map data may be used to support geo-referencing tasks, i.e. the relation of the image data 8 provided by the capturing device 3 to a geographic reference coordinate system by overlaying road-centre polylines or road-shape polygons.

Furthermore, the map data may enable to locate relevant roads and lanes in the image data 8. In an exemplary embodiment, map data may enable to distinguish between parked vehicles and vehicles actually driving. For detecting vehicles actually driving, areas that are marked as parking lanes (parking lot) in map data can be neglected if suitable for the individual task for traffic analysis. Map data may include tagged information such as a lane width or the number of lanes, which further enables to focus processing of the image data 8 if taken into regard by the evaluation processor 4.

Dynamic complementary data 12, 13 may include information conveyed by dynamic mobile entities such as mobile phones (wireless phones) or eCall devices (emergency call) in vehicles. In this case, position information of localization devices, e.g. satellite navigation system receivers of these mobile entities can be analysed on a macroscopic level. This first source for an approximate traffic volume estimation and traffic density information may subsequently be fused with results of evaluation of the image data 8 provided by the capturing device 3 as a second source in order to generate the enhanced traffic data.

Using eCall is an advantageous possibility for trigger generation as an automatic emergency call system for motor vehicles is prescribed by the European Union and installed in all recent models of cars and light commercial vehicles. The eCall devices automatically report a traffic accident to a uniform European emergency number.

The evaluation processor 4 may comprise one or multiple servers as hardware, on which software for processing input data, in particular the image data 8, the trigger data 11 and possibly also complementary data 12 in order to generate the enhanced traffic data according to a traffic evaluation task is running. The traffic evaluation task may, for example, include determining a traffic flow in the area-of-interest. The traffic evaluation task may include determining traffic velocities, traffic densities or similar traffic related parameters describing the traffic flow in the area-of-interest.

The evaluation processor 4 may perform tasks ranging from pre-processing of localization data via the processing of satellite raw image data, e.g. provided in image data 8, to the calculation of traffic volume related parameters, for example computing traffic densities on specific road segments within the area-of-interest. Pre-processing of localization data performed by the evaluation processor 4 may include allocating a certain vehicle to its corresponding lane in the image data 8 and map data, for example for lane-level traffic density analysis. Alternatively, allocating a certain vehicle (ego-vehicle) may be performed by an electronic processing unit on board of an ego-vehicle based on the enhanced traffic data provided in the control signal 10 to the actuator 5 of the ego-vehicle.

The evaluation processor 4 may be located on board of a satellite in space, on an aerial vehicle, for example on an UAV or on located ground-based by one or more static servers. The evaluation processor 4 may be implemented in a spatially distributed manner or be centralized at one single site. The implementation decision may in particular take into regard criteria concerning computation requirements and signal latency.

The actuator 5 is an entity that receives the enhanced traffic data in the control signal 10 from the evaluation processor 4.

The actuator 5 may form part of a traffic participant or be co-located with a traffic participant. The actuator 5 may form part of a vehicle navigation system, which generates and outputs information to a vehicle operator based on the enhanced traffic data. The actuator 5 may form part of a traffic information system, e.g. TMC or dynamic road signs, which generates and outputs information to a vehicle operator based on the enhanced traffic data. The actuator 5 may be integrated into a control system for an autonomously operating vehicle or for an advanced driving assistance system (ADAS) and be adapted to support autonomous navigation of the ego-vehicle (host-vehicle) within a dynamically changing traffic scenario.

The actuator 5 may form part of a traffic infrastructure device (road infrastructure device). The traffic infrastructure device may, for example, include traffic lights which are controlled based on the enhanced traffic data. In an exemplary embodiment, the actuator 5 may include traffic signs for adapted for dynamically assigning lanes to specific classes of vehicles, such as trucks, small commercial vehicles of a certain weight class, or cars, for example at toll collecting points, national border crossings or road-side intelligent transportation system units.

Further potential beneficiaries of the system 1 are traffic participants that may request information generated based on the enhanced traffic data along their scheduled route.

The enhanced traffic data can be used for informational purposes, for example using displays or haptic user interfaces for user warning, and/or for control purposes, for example controlling traffic lights, and/or within advanced driver assistance systems, and/or for analysis purposes, for example a time dependent traffic volume evaluation over time period such as a day or a week.

The enhanced traffic data can either be requested by the beneficiary by active acquisition via the actuator 5, for example, or distributed to one or a plurality of actuators 5 by the evaluation processor 4, thereby implementing a passive acquisition scheme.

Figure 2:
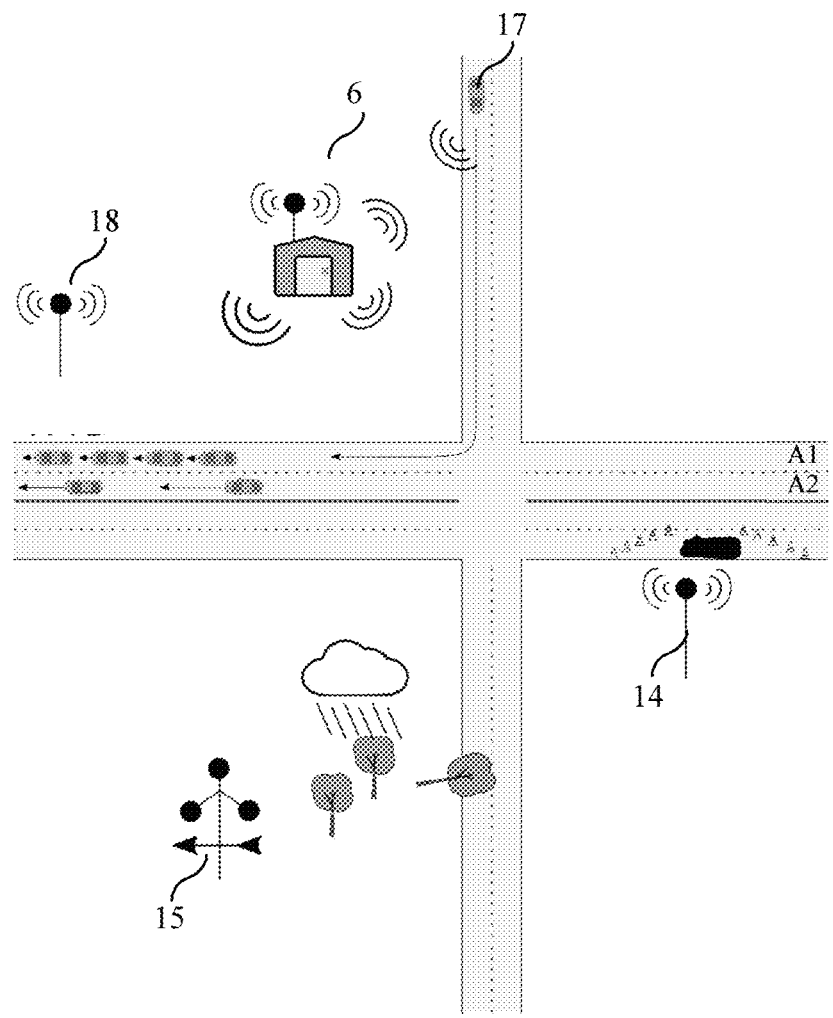
FIG. 2 illustrates examples for triggers according to an exemplary embodiment of the disclosure.

FIG. 2 illustrates some examples for generating trigger data 7 according to an exemplary embodiment.

In general, a trigger is a request to the evaluation processor 4. The trigger is issued by the trigger processor 2 and is transmitted in trigger data 7, 11 to the evaluation processor 4 and the capture device 3. The request comprises data on an area-of-interest. The area-of-interest defines a specific spatial location or area that is of relevance for traffic related tasks performed by the actuator 5. The trigger processor 2 considers continuous events (continuous triggers), e.g. telemetry-based generated triggers, as well as single or steady events (one-shot triggers), e.g. TMC-based generated triggers.

A continuous trigger may indicate a suspicion, e.g. an unusually low average velocity of vehicles on a road segment suggesting a potential traffic jam on this road segment. FIG. 2 depicts such potential traffic jam on a lane A1 leading away from the crossing at the center of FIG. 2. This potential traffic jam may be detected by the trigger processor 3 based on complementary data 13 provided by the complementary data provider 6 in the form of data including localization data and a mean vehicle velocity speed calculated based on data from a plurality of mobile devices on board of vehicles on the lanes A1, A2 in FIG. 2. The complementary data provider 6 acquires this data via data from a cellular wireless communication system 18.

Regarding one-shot triggers, they can be separated into implicit and explicit triggers. Explicit triggers describe a directly defined event, e.g. a location of a road construction site or an accident site. FIG. 2 shows TMC data concerning a road construction site provided in the complementary data 13 from a TMC transmitter 14.

Implicit triggers provide indirect hints, e.g. on the occurrence of a thunderstorm in a wooded area that may lead to fallen trees partially or entirely obstructing the road. The weather station 15 in the lower portion of FIG. 2 may provide further complementary data 13 including weather information. The weather information may form the basis for defining trigger events and therefore triggers events for generating trigger data 7, 11 based thereon.

Furthermore, a beneficiary may issue a request and initiate a trigger in order to check on a traffic situation at a specific location even though no other trigger has been issued in automatically generated trigger data 7, 11 by the trigger processor 2. In FIG. 2, an ego-vehicle 17 may benefit from detecting any of the trigger events: The road construction site notified by public bodies, the fallen tree blocking the road predicted based on weather data from the weather station 15 and the traffic jam on lane A1 based on data from TMC transmitter 14. As the ego-vehicle 17 of FIG. 2 intends to turn to its right at the crossing, the area-of-interest may be restricted to the lanes A1, A2 leading to the left from the crossing when viewing FIG. 2. This intended course of the ego-vehicle 17 may be determined based on data from a navigation system on board of the ego-vehicle 17, or an activated turn indicator of the ego-vehicle 17. The trigger processor 2 may therefore restrict trigger data 7, 11 to convey an area-of-interest corresponding to a trigger event of the presumed traffic jam on lane A1, and disregard further potential trigger events relating to the fallen tree and the road construction site. Obtaining the image data 8 and thus evaluation in the evaluation processor 4 may be accordingly restricting on those portion of image data 8 consisting of lanes A1, A2 leading to the left from the intersection in FIG. 2. The advantageous processing characteristics of the system 1 using the concept of triggers becomes immediately apparent.

In order to avoid an overload of the system 1 or success of a denial-of-service attack (DoS attack) against the system 1, the system 1 may implement measures to restrict manually generated trigger requests issued by a beneficiary. Means such as a required payment for processing a request, or a limited number of requests permitted per predetermined time interval may enable to prevent an overload of the system 1.

The most common triggers can be separated and interpreted as continuous triggers (interpreted as "there is something suspicious"), implicit one-shot triggers (interpreted as "there could be something") and explicit one-shot triggers (interpreted as "there certainly is something but the extent or consequences are unclear").

Figure 3:
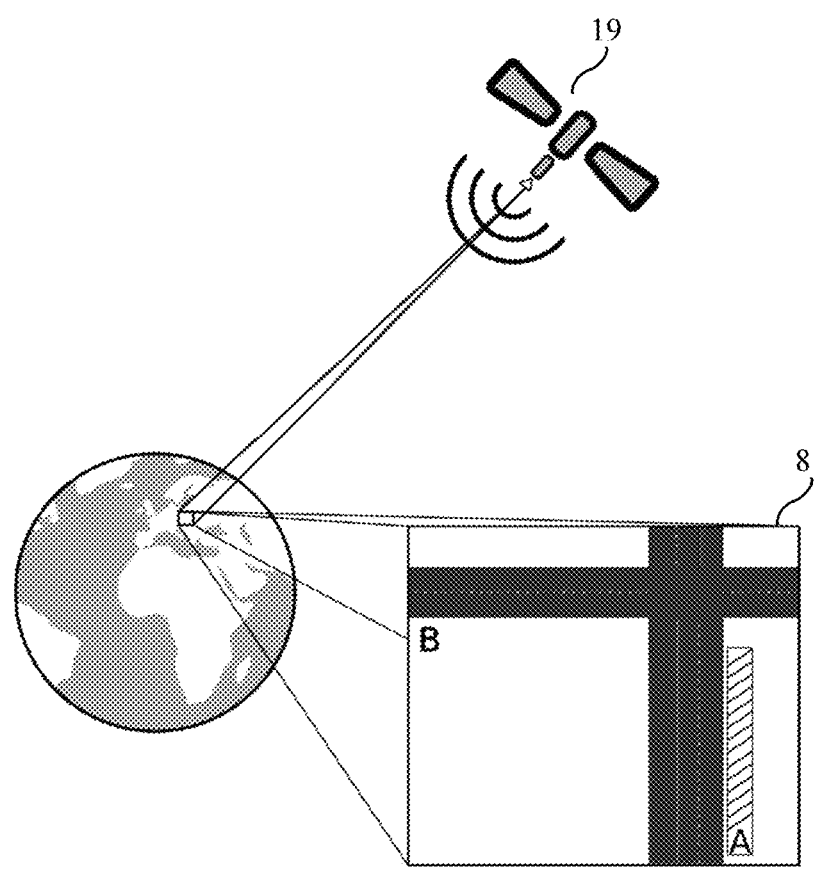
FIG. 3 shows determining an area of interest for image processing of satellite data according to an exemplary embodiment of the disclosure.

FIG. 3 shows an example for determining an area-of-interest for image processing of satellite data. The satellite 19 includes the capturing device 3 and may capture an image and generate image data 8 based on the captured image and the trigger data 7. The trigger data 7 may include location data defining the area-of-interest. The process of capturing images and/or generating image data 8 from the captured images may accordingly controlled by the satellite 19, a ground control element of the satellite 19 such as a satellite server, or the capturing device 3 based on the trigger data 7.

The image data 8 comprises image data on the area-of-interest that includes only a portion of the entire area monitored by the satellite 19.

The area-of-interest defined by the trigger data 7, 11 concerns two aspects. In the first aspect, a trigger request generated and communicated by the trigger processor 2 in the trigger data 7, 11 includes a geometrical location or an area that shall draw the focus of the capturing device 3 towards a specific spatial location, e.g. an area-of-interest in geographic coordinates. For example, within a defined radius around this specific spatial location, the capturing device 3 acquires the image data 8.

In the second aspect, complementary data 12, 13 or data processing algorithms can be used to further specify a restricted area-of-interest within the acquired image data 8. For example, a satellite image, road segmentation algorithms or (geometric map data) may be used to restrict the evaluation processing performed by the evaluation processor 4 to the image data 8 corresponding to a road area while simultaneously image data 8 corresponding to areas irrelevant to an evaluation task can be excluded explicitly from the evaluation processing. For example, a parking lane A presents an example for an irrelevant area for traffic flow estimation. This distinction between parking lane area and road lane area B supports a distinction between vehicles stuck in a traffic jam and parked cars in the obtained image during evaluation of the image data 8 by the evaluation processor 4.

The system 1 implements an advantageous approach for traffic evaluation. The processing effort for generating the enhanced traffic data can be significantly reduced compared to a processing of large and indiscriminate areas and their corresponding image data. Additionally, the system 1 enables to manage aspects of data privacy in an advantageous manner, since there exists no direct connection between detected vehicles and personal information, contrary to mobile device-based, e.g. smartphone-based, telemetry approaches to address this task.

The combined concepts of FIG. 2 and FIG. 3, in particular the concept of generating the trigger data 7, 11 illustrated in FIG. 2 and the concept of defining an area-of-interest discussed with respect to FIG. 3 show key elements of the system 1, which interact and yield particular advantageous effects. The system 1 implements the idea of processing dynamically acquired top view image data 8, e.g. satellite imagery, in order to derive traffic related information therefrom while focusing the most complex processing steps on certain locations (area-of-interest) of particular relevance for the task of traffic analysis. The capturing device 3 waits for a trigger provided via trigger data 7, 11 from the trigger processor 2, the trigger data 7, 11 indicating the area-of-interest. Image data 8, possibly including a sequence of images focusing on the area-of-interest is then acquired by the capturing device 3 on bard of the satellite 19 and passed to the evaluation processor 4.

Figure 4:
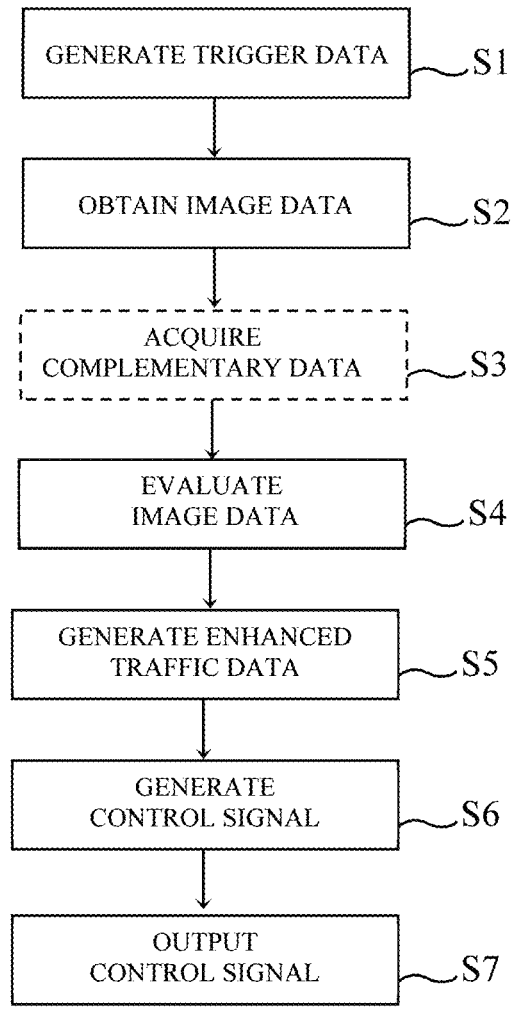
FIG. 4 presents a flowchart depicting a sequence of processing steps of the method according to an exemplary embodiment of the disclosure.

FIG. 4 presents a flowchart depicting a sequence of processing steps of the method for controlling at least one of a traffic infrastructure device, and an actuator of a traffic participant based on enhanced traffic data according to an exemplary embodiment of the invention.

In step S1, the trigger processor 2 monitors an area. The monitored area may refer to an area in which a plurality of vehicles is moving. The trigger processor 2 generates trigger data 7, 11 in case the trigger processor 2 determines a trigger event occurring in the monitored area. The trigger data 7, 11 may be generated based on the determined trigger event and obtained complementary information 13, for example obtained map data.

The trigger processor 2 provides the generated trigger data 7 indicating an area-of-interest to capturing device 3. The area-of-interest includes a portion of the monitored area, and therefore image data tailored to those portions of a captured traffic scene, which are relevant to the traffic evaluation task at hand, the determined trigger event, and the generated trigger data 7 basing thereon.

In step S2, the capturing device 3 obtains image data 8 on the area-of-interest based on the trigger data 7 and transmits the obtained image data 8 to the evaluation processor 4.

In an optional step S3, the evaluation processor 4 may obtain from a complementary information provider 6 complementary information 12. The complementary information 12 may, for example include map data on the monitored area and, in particular, the area-of-interest.

The evaluation processor 4 performs analysis on the obtained image data 8 in step S4. In particular, the evaluation processor 4 evaluates the image data 8 corresponding to the area-of-interest to generate enhanced traffic data on the area-of-interest.

The evaluation processor 4 may evaluate the obtained image data 8 after pre-processing the obtained image data 8 based on the obtained complementary information 12.

The evaluation processor 4 analyses the image data 8, potentially under consideration of the complementary data 12 such as map data and/or telemetry data with low detail information. In particular, the evaluation processor 4 performs processing to detect traffic entities such as vehicles within the obtained image data 8. Depending on the evaluation task, the evaluation processor 4 may execute processing to classify the detected traffic entities into distinct classes of traffic entities, such as cars, busses, trucks, or motorcycles.

The evaluation processor 4 may apply image segmentation techniques on the image data 8. The processing may also include a detection of temporarily updated road courses or addition and/or removal of individual lanes to or from roads. Generally, existing approaches known in the field of map generation from satellite imagery may be employed to perform these processing steps. O. Pink and C. Stiller, "Automated map generation from aerial images for precise vehicle localization," 13th International IEEE Conference on Intelligent Transportation Systems, Funchal, 2010, pp. 1517-1522 include further details concerning these aspects of the evaluation processing in the evaluation processor 4.

The evaluation processor 4 generates a detailed, preferably a lane-level, analysis of the traffic behavior underlying the obtained image data 8. The evaluation processor 4 generates and outputs enhanced traffic data including traffic volume information. The enhanced traffic data may include information and traffic related parameters such as a current density of vehicles on a certain lane of a road in the area-of-interest. The enhanced traffic data may also include information on a predicted future evolvement of a traffic scenario, in particular the prediction of the evolvement of the traffic scene based on a determined current event.

Such determined event may refer to a tree that blocks two out of three lanes of a road segment, which is predicted to result in a potential traffic jam in a rush hour with increased traffic volume on the road segment.

The evaluation processor 4 may perform further processing in order to deduce underlying reasons for a determined traffic event. Reasons may include a rush hour, an accident, and/or a road blockage. The reasons may include multiple levels of precision, for example a road blockage (coarse first level of reasons) may include on a finer second level of reasons a road blockage due to a fallen tree, due to a land slide, due to a flooded area, or due to scheduled construction work. The evaluation processor 4 may perform further processing by considering information provided by the trigger processor 2 in the trigger data 11, e.g. including data from a weather station 15, and/or information provided in the form of complementary data 12 acquired from the complementary data provider 6. The complementary data provider 6 may, for example, provide complementary data originating from external telemetry sources, map data, or even commonly available information such as a current time.

In a step S6, the evaluation processor 4 generates the control signal 10. The generated control signal 10 includes the enhanced traffic data. In step S7, the evaluation processor 4 outputs the generated enhanced traffic data in the control signal 10 to the actuator 5. The control signal 10 is configured to control the actuator 5.

The actuator 5 may be an actuator of a traffic participant, in particular a vehicle actuator, or an actuator of a road infrastructure device. The actuator 5 may use the enhanced traffic data for generating an output on a display to a driver of a vehicle based on the enhanced traffic information. The actuator 5 may use the enhanced traffic data for generating an output on a display of a mobile device of a hiker based on the enhanced traffic information concerning a hiking track. The control signal 10 may control and output information, e.g. safety related warning, update of navigation or comfort related information, and/or control of physical devices, e.g. traffic light or advanced driver assistance systems of vehicles, and/or traffic analysis, e.g. daytime dependent traffic volume evaluation.

In an exemplary embodiment, a road infrastructure device such as a traffic light may control the duration of stop phases and/or go-phases at an intersection based on the enhanced traffic information, which includes traffic density information on the intersecting roads. This will improve traffic flow at the intersection by adapting to a current traffic volume and traffic distribution of traffic entities on the available traffic space.

Figure 5:
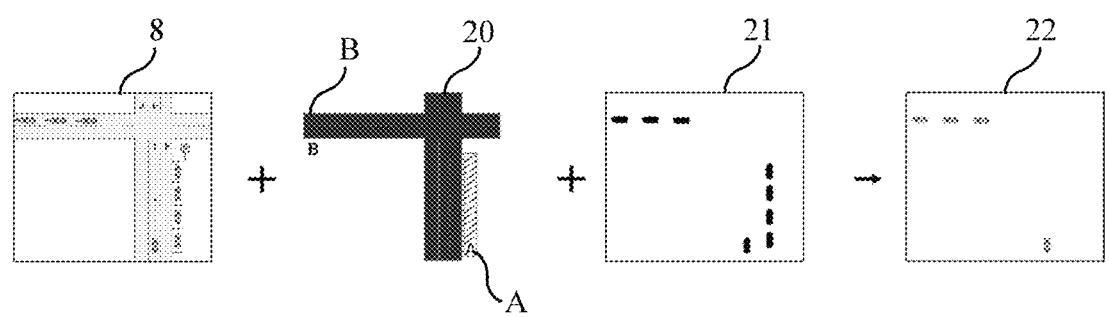
FIG. 5 shows a processing of exemplary image data showing a road traffic scenario in an exemplary embodiment of the disclosure.

FIG. 5 shows an evaluation of image data 8 showing a road traffic scenario in an implementation of the invention.

In particular, FIG. 5 illustrates the sequence from image data 8 of a satellite image on the left (snapshot image) and corresponding complementary data 12, here complementary map data as input data to pre-processed image data for further evaluation in the evaluation processor 4. The evaluation processor 4 performs vehicle detection. The map data 20 includes areas that are of high interest for a traffic flow estimation, such as road area B. Area A depicting a parking lot may be disregarded during evaluation of the image data 8 without adverse effects on the traffic flow estimation.

The evaluation processor 4 performs vehicle detection based on the obtained image data 8 and generates a detection result 21 depicting all detected vehicles in the image data 8. The detected vehicles include actually moving vehicles, or vehicles, which at least intend to move, on road area B and parked vehicles on parking lot area A.

The evaluation processor 4 performs image processing for detecting vehicles within the image data 8. The result of map data consideration and image processing 22 is shown on the right of FIG. 5. Only vehicles relevant for estimating the traffic flow are shown while parked vehicles are neglected due to taking the information on parking lot area A included in the map data 20 into account.

Figure 6:
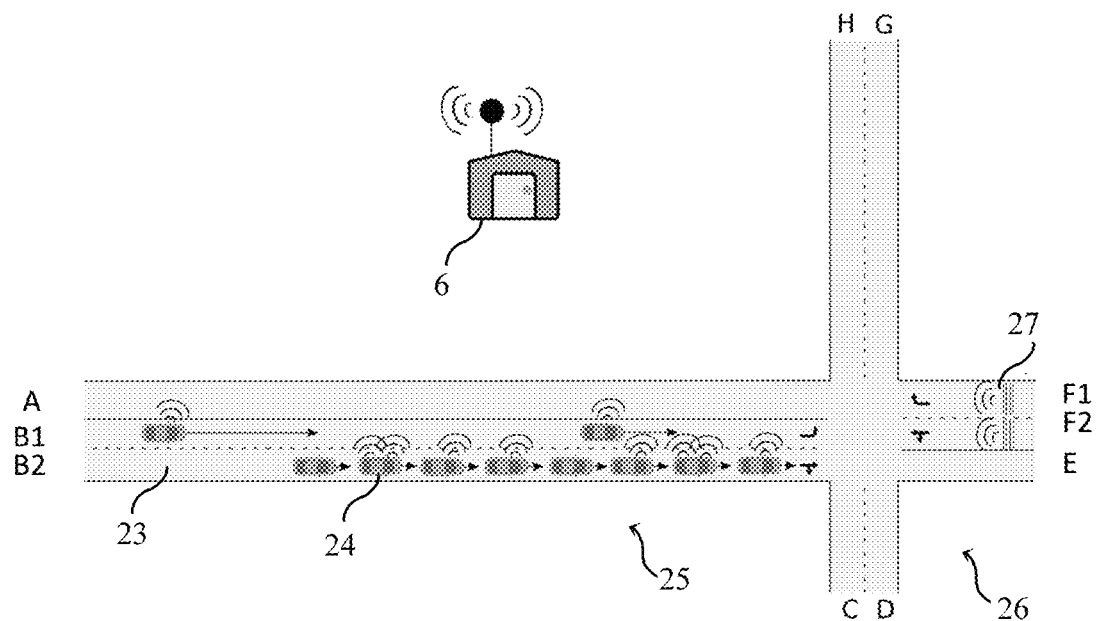
FIG. 6 depicts an exemplary road traffic scenario in an exemplary embodiment of the disclosure.

FIG. 6 depicts an exemplary road traffic scenario at an intersection 26 in an implementation of the invention. The road infrastructure device 27 is situated such that it may determine traffic data on vehicle traffic on lanes F1, F2 leading to the intersection 26 only. This data on vehicle traffic on lane F may be highly accurate concerning the number of vehicles on lanes F1, F2 passing the road infrastructure device 27, but does not enable a traffic density estimation covering the entire area of the intersection 26 with the intersecting roads including also lanes A, B1, B2, C, D, E, G, and H.

The complimentary data provider 6 may also provide data from a plurality of mobile wireless devices on board of the plurality of mobile wireless devices associated with persons present on board of the vehicles 25 cruising with a low velocity on lane B1. Nevertheless, as some of the vehicles, for example vehicle 24 have more than one person on board, a number of vehicles in the traffic jam including the plurality of vehicles may be overestimated in case the evaluation of the current traffic scenario is solely based on complimentary data 13 including data on mobile wireless devices on board of the plurality of vehicles 25 on the road B1, B2 with the traffic jam.

Moreover, differentiating between the two lanes of road B1, B2 leading towards the intersection 26 is not possible due to a low localization resolution of navigation receivers of the mobile wireless devices on the plurality of vehicles 25.

Determining a trigger event of a presumed traffic jam on road B1, B2 leading towards the intersection 26, generating trigger data 7, 11 requesting image data depicting the intersection 26 and subsequent evaluation of the obtained image data 8 offers the possibility to not only detect the traffic jam, but also to judge possible reasons for the traffic jam and via taking the correct number of vehicles 25 into account, how long dissolution of the traffic jam may require.

Figure 7:
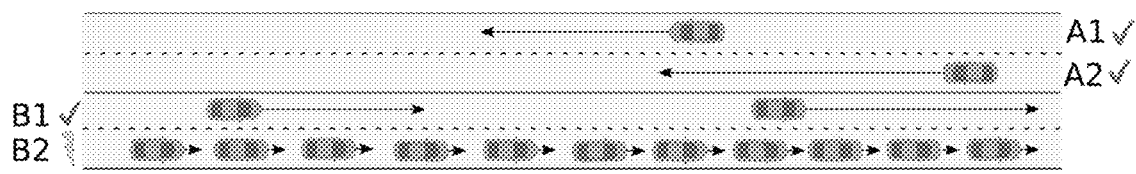
FIG. 7 depicts an exemplary road traffic scenario on a road lane level in an exemplary embodiment of the disclosure.

In case of vehicle 23 as an intended beneficiary of the enhanced traffic data generated in FIG. 7, the image data 8 evaluated may even be restricted to processing an area-of-interest covering lanes E, G, C, B1 and B2, disregarding lanes A, D, F, and H, without adversely affecting the quality of the generated traffic data.

FIG. 7 depicts an exemplary road traffic scenario on lane level in an implementation of the invention. The depicted road segment includes four lanes A1, A2, A3, A4, two lanes in each of the two directions of travel. The lane B2 is congested. The vehicles on lanes A1, A2 and B1 each cruise with vehicle velocities, which significantly exceed the vehicle velocities of the vehicles on lane B2.

A mean velocity of the vehicles on lane B2 will most probably deviate from a maximum allowed velocity on the lanes B2, B1. The trigger processor 2 may therefore determine a trigger event present on road B1, B2, for example based on an evaluation of data provided by mobile wireless devices and obtained from the complementary data provider 6 in complementary data 13.

Figure 8:
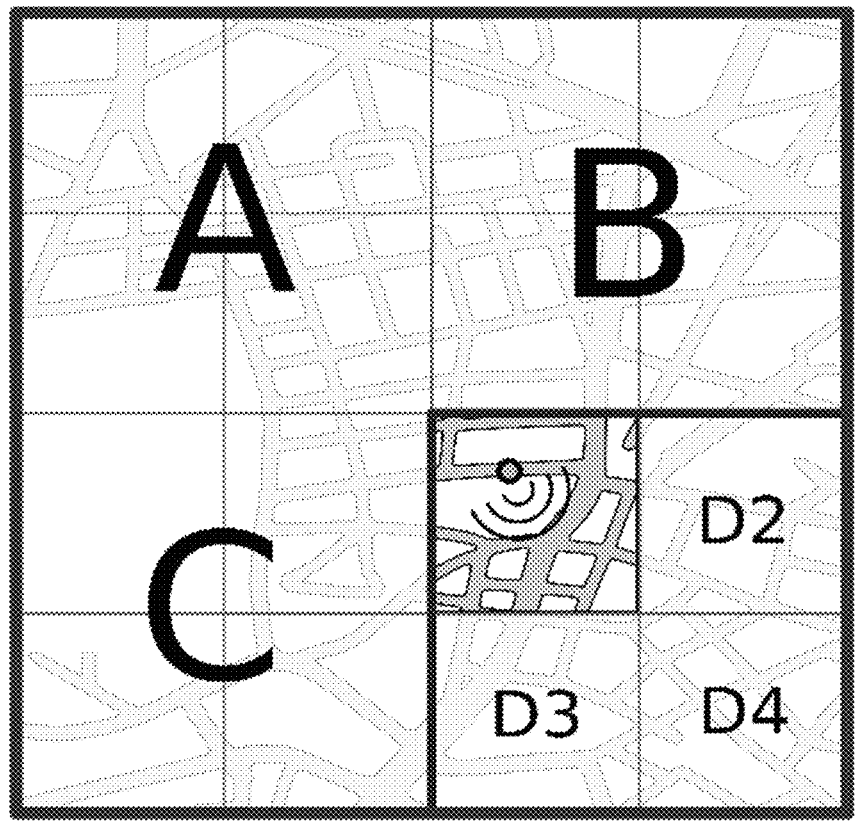
FIG. 8 illustrates a segmentation of image data in an exemplary embodiment of the disclosure.
Figure 8:
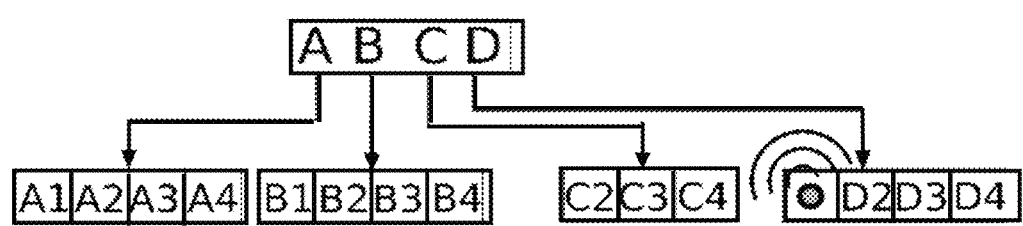

FIG. 8 illustrates details of the trigger processing and a segmentation of map data 8 in an implementation of the invention.

A central server stores complementary information 11 in form of map data. The map data in FIG. 8 is a road map M, which a complementary data provider 6 provided as an external service. The central server performs the functions of the trigger processor 2. The road map M={$S_1$, ..., $S_k$} is divided into a plurality of k road segments $S_i$. Each road segment has a unique identifier ID and a set of n GNSS coordinates $gnss_j$ describing the position of the road segment $$S_i = \{gnss_1, \ldots, gnss_n\}.$$

Each traffic package is assigned to the closest road segment by the central server.

$$ID_{assign} = \operatorname*{argmin}_{i}\left(d(g, gnss) \mid gnss \in \bigcup_{i=1:k} S_k\right);$$

with a distance function d(x, y).

FIG. 8 illustrates an embodiment, in which the road map M is divided into fractal cells applying a quad-tree technique. This approach avoids computing the distance d to all known road points, and accordingly has advantageous computing characteristics. Based on using a position of the traffic package, a lowest level of the tree is found in a few iterations of the processing. At the lowest level of the road map M, for example representing a cell of 100×100 m cell size in real world in the road map M, only a few possible road segments are remaining. FIG. 8 illustrates a quad-tree of a road segment. The road map is divided into fractal cells A, B, C, D on a first segmentation level. The second segmentation level divides each fractal cell A, B, C, D of the first segmentation level into four fractal cells on the second segmentation level as depicted in FIG. 8. The fractal cell A is segmented into the four fractal cells A1, A2, A3, and A4. The marker of a vehicle depicted as travelling on a road segment of the road map in the upper portion of FIG. 8 corresponds to a fractal cell with the cell identifier D1 on the second segmentation level in the lower portion of FIG. 8.

A traffic package included in complementary information 12 is subsequently used to update a traffic velocity distribution of the road segment with the road segment identifier $S_{ID}$. Subsequently, it is checked whether the road updated traffic velocity distribution of the road segment with the road segment identifier $S_{ID}$ differs from an expected value for traffic velocity distribution of the same road segment, and how much it differs from the expected value for the traffic velocity distribution of the road segment with the road segment identifier $S_{ID}$.

This may be performed by the trigger processor 2 computing a mean velocity from the updated traffic velocity distribution. The computed mean velocity may then be compared to an allowed traffic velocity for the road segment with the road segment identifier $S_{ID}$. If, for example, the computed mean velocity deviates more than 20% from the allowed traffic velocity for the corresponding road segment, the trigger processor 2 determines that there actually is light traffic on the road segment. If the computed mean velocity deviates more than 50% from the allowed traffic velocity for the road segment, the trigger processor 2 determines heavy traffic to be currently present on the road segment. If the computed mean velocity deviates more than 80% from the allowed traffic velocity for the corresponding road segment, the trigger processor 2 may determine a trigger event, in particular a traffic jam to occur on the road segment. The trigger processor 2 then proceeds with generating trigger data 7, 11.

If the trigger processor 2 determines the traffic jam on the road segment, the trigger processor 2 generates trigger data 7, 11 and an indication signal I={ID, t} including the trigger data 7, 11. The trigger processor 2 transmits the indication signal I with the trigger data 7, 11 to a satellite server. The satellite server represents a ground-based control element of a satellite network. The satellite network comprises a plurality of earth surveillance satellites 19 connected via a communication network with its ground-based control element. Each of the plurality of earth surveillance satellites 19 is positioned to capture images using its capture device 3 from at least a portion of a surveillance area of the satellite 19 on the ground and to generate image data 8 therefrom. The surveillance area of an individual satellite 19 may move over ground with time. The satellite server determines, which satellite 19 and which capture device 3 is in a spatial position to capture the road segment $S_{ID}$ indicated in the trigger data 8 at the earliest.

If the satellite server determines that there is a specific satellite 19 passing over segment $S_{ID}$ within an acceptable time, the satellite server requests image data 8 of the street segment $S_{ID}$ from the specific satellite 19. The acceptable time may be a time within a predefined time period, for example of 15 minutes, from a time indicated in the trigger data 7. The predefined time period may be selectable by the trigger processor 2. Additionally or alternatively, the predefined time period may be selectable by the evaluation processor 4 and communicated in the request signal 9, for example based on a specific traffic evaluation task for which the image data 8 is requested.

In an exemplary embodiment, the satellite server may access a continuously updated database comprising a plurality of sets of image data 8. If image data 8 of sufficient actuality and covering the area-of-interest including the road segment $S_{ID}$ is available, the satellite server obtains the suitable image data 8 from the data base and provides the obtained image data 8 covering the road segment $S_{ID}$ to the evaluation processor 4 for further evaluation by performing image analysis.

If, for example, no satellite of the satellite network is currently in a position to capture an image including the road segment $S_{ID}$, and, furthermore, a time of more than the predefined time limit, for example 15 minutes, will elapse until the image data 8 on the road segment $S_{ID}$ will be available at the satellite server, the indication signal I including the trigger data 7 may be discarded. In this case, a notification indicating the estimated time until image data 8 is available may be sent from the satellite server to the trigger processor 2 in return. The trigger processor 2 may use this returned information from the notification to block indication signals I for the corresponding road segment $S_{ID}$ until the predefined time period elapsed, thereby avoiding signal spamming of the system 1.

The system 1 and the corresponding method are discussed with reference to a road traffic environment, and vehicle traffic. The approach may be adapted to air traffic scenarios, air traffic routes and aircraft in a further embodiment providing corresponding advantages for air traffic management applications. An alternate embodiment of the system 1 may be applied to sea traffic scenarios, shipping routes and vessel traffic systems. Another alternative embodiment of the system 1 may be applied to human traffic such as hikers on a hiking road or runners on an urban running track.

It will be apparent to those skilled in the art that various modifications and variations can be made to the structure of the invention without departing from the scope or spirit of the invention. In view of the foregoing, it is intended that the present invention cover modifications and variations of this invention provided they fall within the scope of the following claims and their equivalents.

What is claimed is:

1. A method for controlling at least one of a traffic infrastructure device and an actuator of a traffic participant based on enhanced traffic data, the method comprising:
    monitoring, by a trigger processor, an area;
    generating, by the trigger processor, trigger data in case a trigger event is determined in the monitored area and providing the generated trigger data indicating an area-of-interest to an image data source,
        wherein the trigger data is generated based on telemetry data acquired by at least one traffic infrastructure device and/or data on mobile wireless devices in the monitored area by calculating at least one of a mean traffic density value and a mean velocity value, and
        wherein the trigger event is determined:
            in case of a difference of the calculated mean traffic density value from a predetermined traffic density value exceeds a predetermined traffic density threshold, or
            in case of a difference of the calculated mean velocity value from a predetermined mean velocity value exceeds a predetermined velocity threshold, and
        wherein the area-of-interest is a portion of the monitored area;
    obtaining, by the image data source, image data on the area-of-interest based on the transmitted trigger data and transmitting the obtained image data to a traffic evaluation processor;
    evaluating, by the traffic evaluation processor, the received image data to generate enhanced traffic data on the area-of-interest; and
    outputting, by the traffic evaluation processor, the generated enhanced traffic data in a control signal, wherein the control signal is configured to control the traffic infrastructure device and/or the actuator of the traffic participant.

2. The method according to claim 1, wherein
the obtained image data include at least one of a camera image, a radar image, a multi-spectral image and a point cloud.

3. The method according to claim 1, wherein
generating the trigger data is based on at least one of TMC data, disaster or weather warnings.

4. The method according to claim 1, wherein
the trigger event further includes at least one of a traffic jam, an accident, an emergency call, a construction site, a weather phenomenon, a natural disaster.

5. The method according to claim 1 further comprising:
    obtaining, from a complementary information provider, complementary information, wherein the complementary information includes in particular map data on the monitored area, wherein the trigger data is generated based on the determined trigger event and the obtained complementary information; and evaluating the obtained image data comprising preprocessing the obtained image data based on the obtained complementary information.

6. The method according to claim 5, wherein evaluating the obtained image data comprises:

using the obtained complementary information, by the traffic evaluation processor, for restricting evaluation of the obtained image data on the area-of-interest.

7. The method according to claim 5, wherein evaluating the obtained image data comprises:

using the obtained complementary information, by the traffic evaluation processor, for restricting evaluation of the image data on traffic routes in the area-of-interest.

8. The method according to claim 5, wherein evaluating the obtained image data comprises:

using road map data included in the obtained complementary information, by the traffic evaluation processor, for evaluating the image data on a per lane basis.

9. The method according to claim 5, wherein evaluating the obtained image data comprises:

using the obtained complementary information, in particular road map data, by the traffic evaluation processor, for distinguishing between parked vehicles and driving vehicles based on location of the vehicles.

10. The method according to claim 5, wherein evaluating the obtained image data comprises:

evaluating includes extracting, by the traffic evaluation processor, features from the image data, and aligning the obtained complementary information and the image data based on the extracted features.

11. A non-transitory computer-readable recording medium having computer-readable program instructions stored thereon, which, when executed by a computer or digital signal processor, cause the computer or digital signal processor to perform a method for controlling at least one of a traffic infrastructure device and an actuator of a traffic participant based on enhanced traffic data, the method comprising steps of:

monitoring, by a trigger processor, an area;

generating, by the trigger processor, trigger data in case a trigger event is determined in the monitored area and providing the generated trigger data indicating an area-of-interest to an image data source, wherein the trigger data is generated based on telemetry data acquired by at least one traffic infrastructure device and/or data on mobile wireless devices in the monitored area by calculating at least one of a mean traffic density value and a mean velocity value, and wherein the trigger event is determined:

in case of a difference of the calculated mean traffic density value from a predetermined traffic density value exceeds a predetermined traffic density threshold, or in case of a difference of the calculated mean velocity value from a predetermined mean velocity value exceeds a predetermined velocity threshold, and wherein the area-of-interest is a portion of the monitored area;

obtaining, by the image data source, image data on the area-of-interest based on the transmitted trigger data and transmitting the obtained image data to a traffic evaluation processor;

evaluating, by the traffic evaluation processor, the received image data to generate enhanced traffic data on the area-of-interest; and outputting, by the traffic evaluation processor, the generated enhanced traffic data in a control signal, wherein the control signal is configured to control the traffic infrastructure device and/or the actuator of the traffic participant.

12. A system for controlling at least one of a traffic infrastructure device and an actuator of a traffic participant based on enhanced traffic data, the system comprising:

a trigger processor configured to monitor an area, to generate trigger data in case a trigger event is determined in the monitored area, and to provide the generated trigger data indicating an area-of-interest to an image data source, wherein the area-of-interest is a portion of the monitored area, wherein the trigger processor is configured to generate the trigger data based on telemetry data acquired by at least one traffic infrastructure device and/or data on mobile wireless devices in the monitored area by calculating at least one of a mean traffic density value and a mean velocity value, wherein the trigger event is determined:

in case of a difference of the calculated mean traffic density value from a predetermined traffic density value exceeds a predetermined traffic density threshold, or in case of a difference of the calculated mean velocity value from a predetermined mean velocity value exceeds a predetermined velocity threshold, and;

the image data source configured to obtain image data captured by a capture device on the area-of-interest based on the trigger data, and to transmit the obtained image data to a traffic evaluation processor; and the traffic evaluation processor configured to evaluate the image data to generate enhanced traffic data on the area-of-interest; and an output device configured to output the generated enhanced traffic data in a control signal, wherein the control signal controls the traffic infrastructure device and/or the actuator of the traffic participant.

13. The system according to claim 12, wherein the capture device is arranged on at least one of a satellite, an air vehicle, in particular an aircraft or an unmanned aerial vehicle, or mounted on a high building.

14. The system according to one of claim 12, wherein the traffic evaluation processor includes at least one central server.

* * * * *